Feb. 9, 1971 K. BUTTER ET AL 3,561,898
FORM LOCKING MOUNTING FOR COMBUSTION CHAMBER INJECTOR
Filed April 10, 1969
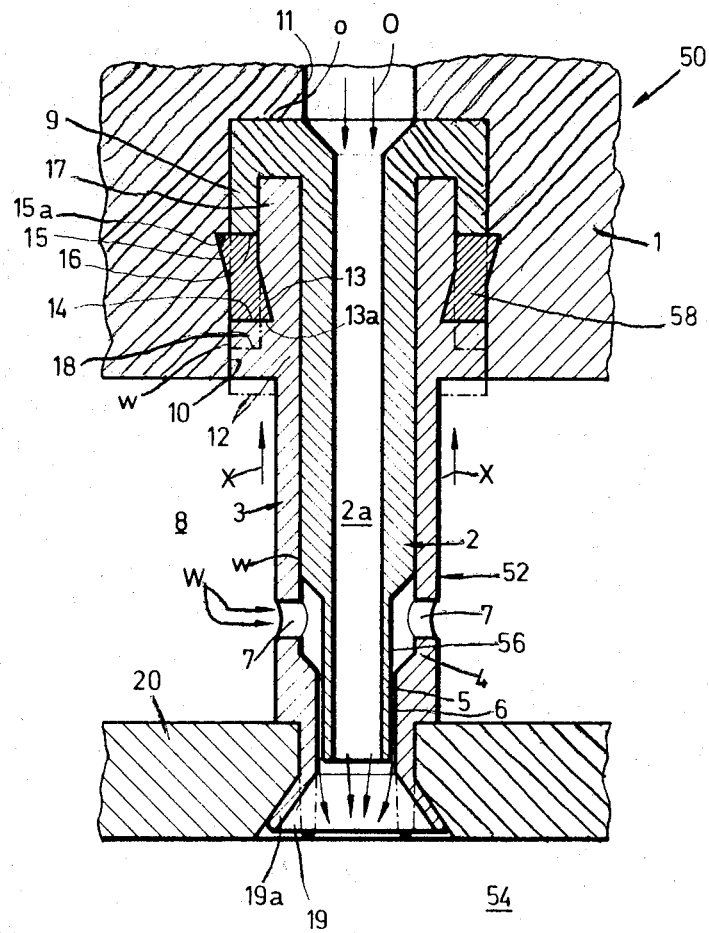
INVENTORS
Karl Butter
Armin Theiss
By
ATTORNEYS United States Patent Office 3,561,898
Patented Feb. 9, 1971

3,561,898
FORM LOCKING MOUNTING FOR COMBUSTION CHAMBER INJECTOR
Karl Butter and Armin Theiss, Munich, Germany, assignors to Messerschmitt-Bolkow Gesellschaft mit beschrankter Haftung, Ottobrunn, near Munich, Germany
Filed Apr. 10, 1969, Ser. No. 814,943
Claims priority, application Germany, Apr. 27, 1968, P 17 50 404.0
Int. Cl. F23d *11/44*
U.S. Cl. 431—167          7 Claims

ABSTRACT OF THE DISCLOSURE

A liquid fuel combustion device includes a combustion chamber injection head of double wall construction with the space between an inner and outer wall forming a conduit for a propellant component. Mounted within the head in a position to span a portion of the inner wall and the outer wall is an injector which comprises an inner cylindrical portion or sleeve having a bore therethrough for the passage of one propellant component. The injector inner sleeve includes a piston head portion in the outer wall which engages over one end of an outer sleeve or tube. The outer sleeve includes an opening located in the space between the inner and outer walls in communication with the first propellant component and it is formed together with the inner sleeve to define an annular space surrounding the inner sleeve which extends axially through a small gap to a flared discharge defined by the outer sleeve at its extension through the inner wall of the head. The two sleeve parts are form-locked together and to the outer wall of the head by a fastening element of relatively soft material which is deformed by pressure and which engages between each sleeve element and the inner wall of the head portion. The inner wall of the head portion and the wall of the inner sleeve are each provided with an annular recess for receiving the deformed material of the fastening element.

SUMMARY OF THE INVENTION

This invention relates, in general, to the form-locking interconnection of two structural parts, particularly passage-forming parts of a combustion device and, in particular, to a new and useful combustion chamber construction including an injection nozzle carried between a double-walled portion of a combustion chamber head and which includes interengaging coaxial parts which are held together and to the head by a form-locking resilient member.

It is known to secure a valve guide bushing in the housing of injection pumps for internal combustion engines. The guide bushing forms a guide for a nozzle needle and its is held in a cap plug which is pressed into an inner step of the valve housing and deformed by pressure or upset in an axial direction, in a manner such that the material of the cap plug is displaced into an annular slot in the step. In this manner, the cap plug forms a form-locking interconnection between the valve housing and the guide bushing. Such an arrangement has the disadvantage that the flow of the displaced material into the annular slot provided in the step is not effected positively, that is, it is not form-locking insofar as the material can yield radially to the inside, so that at least there is some danger that the joint between the valve housing and the cap plug will not remain liquid pressure tight. In addition, such a known construction is suitable only for fixing one part, such as a guide bushing, with another part, such as a valve housing. The fastening element, that is, the cap plug is connected in a form-locking manner only with the valve housing and not also with the guide bushing.

Another example of an interlocking construction is where cylindrical bolts are driven into drum-shaped or paraboloid recesses formed in two parts to be interconnected with each other and the bolts are deformed during this process. In such constructions, there is the danger that a bulgelike upsetting of the bolts will occur since they are driven in at the level of the narrowest cross section of the recesses, and also in the drum-shaped recesses in the outer cross section and the paraboloid recesses in the constricted central cross section. This frequently prevents the bolts from being driven in further or at least it does not guarantee the complete filling of the recesses with the displaced bolt material.

In accordance with the present invention, the disadvantages of the known embodiments are overcome and a safe and pressure-tight connection between two parts is provided by the construction of an injection nozzle having at least two parts which fit one inside the other and which are rigidly connected by a form-locking fastening element to each other and to a wall portion of a combustion chamber. The inventive construction includes an outer sleeve part having an intermediate flange portion and an inner sleeve part having a end-encircling flange portion, forming opposed end faces on the respective flange portions which bear against a resilient fastening element therebetween. The fastening element may comprise a ring made of relatively soft material such as copper. The outer sleeve part at the location of its flange is advantageously provided with an inwardly directed recess and the receiving wall for the injector is also advantageously provided with a recess opposite the end face of the pressure flange of the inner sleeve member. The resilient insert is deformed between the end faces of the opposite flanges so that it is displaced into the respective recesses. The construction is such that the deformable insert includes oblique portions extending in opposite directions into the respective recesses of the associated parts.

This form-locking connection of the deformed resilient insert is particularly suitable, for example, for the form-locking and pressure-tight fastening of injection nozzles and thus the invention provides a combustion chamber construction which includes the mounting of an injection nozzle in a double-walled head portion of a combustion chamber. The injection nozzle is advantageously of a type which is capable of handling two propellant components which may, for example, be burned in a combustion chamber for rocket engines. The arrangement is particularly applicable for mounting such injection nozzles in the injection head of combustion chambers having nozzles which are distributed over one or more pitch circles. In such cases, the injection nozzles must be arranged so that the interengaging sleeve elements providing passages for the various components are held in a pressure-tight orientation to withstand the extreme mechanical and thermal conditions to which they are to be subjected. The construction is such that there must be no leakage between the various component passages in order to avoid undesired reactions inside the duct system when using hyperbolic propellant components. The known nozzle construction for such arrangements include several interengaging parts which are threaded into each other and into the injection head and the sealing is effected by the use of sealing rings and the like. Such arrangements are not suitable at very high hydraulic pressures and great temperature differences. Even the soldering or welding of the injection devices present some difficulties because they involve the risk of heat delay and because the soldered and welded joints cannot be controlled with absolute safety even with the present day techniques.

In the preferred arrangement, the combustion chamber of the present invention includes a double-walled head portion with an injection nozzle mounted between the walls and composed of two sleeve members, one arranged concentrically within the other. The interior sleeve portion terminates in a discharge which is aligned with the inner end of a flanged discharge of the outer sleeve member at the location of the inner wall of the head. The inner sleeve member includes a pressure flange which extends around the end of the outer sleeve member and the outer sleeve member includes an intermediate flange, the flanges forming opposed surfaces between which is interposed a deformable resilient fastening element. The inner sleeve defines a bore passage for one propellant component and the outer sleeve has an opening which communicates in the space between the two walls for admitting a second component into an annular space surrounding the inner sleeve for its subsequent axial movement through a narrow gap to join the discharge of the first component at the location of a flanged outer end of the outer sleeve. The resilient member interengaged between the opposed faces of the flanges of the inner and outer sleeves is also deformed into obliquely extending recesses defined in the outer sleeve and the inner wall of the head, respectively. The construction provides a simple form-locking mechanical connection between the two sleeve parts to orient these parts in a position at which passages defined thereby are sealed one from the other and in a manner such that they can withstand great stresses and maintain extreme tightness under extreme operating loads.

A further advantage of the construction is that the manufacturing of the parts is technologically simple and easy to control. A localization of the deformation zone for the sealing ring in a region which is closed from the outside by the pressure flanges of the inner and outer sleeves is simple to execute, but nevertheless provides a satisfactory sealing arrangement.

Accordingly, it is an object of the invention to provide a form-locking connection between two interengageable parts, particularly tubular parts which are arranged one within the other and which define sealed flow passages, the interengaged tubular parts having exterior flanges with opposed spaced apart faces, and a deformable ring member arranged between the opposed faces under prestress, the resilient ring member advantageously extending obliquely inwardly into a recess defined on the exterior of the inner tubular part and obliquely in an opposite direction into a recess defined in a receiving wall for the tubular parts.

A further object of the invention is to provide a combustion chamber construction which includes an injection head of a combustion chamber of double-walled construction, and an injection nozzle mounted between the inner and outer walls, the nozzle including an inner sleeve member for the passage of one propellant component and an outer sleeve member having an opening to the space between the walls for the passage of a second propellant component, and wherein the inner and outer sleeve members include flange portions advantageously located in the outer wall and which define opposed bearing surfaces, and a resilient deformable sealing member disposed between the bearing surfaces and deformed to extend into a recess of the receiving wall and into a recess of one of the sleeve members.

A further object of the invention is to provide a form-locking construction for two sealed parts and also to provide a combustion chamber construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWINGS

The only figure of the drawings is a partial sectional view of a combustion chamber head for a rocket engine constructed in accordance with the invention.

DETAILED DESCRIPTION OF THE PREFERRED EMBODIMENT

Referring to the drawing, in particular, the invention embodied therein comprises a combustion chamber construction generally designated 50 which includes a head portion for the combustion chamber having an inner wall 20 and an outer wall 1.

In accordance with the invention, an injection nozzle generally designated 52 is mounted within the head portion of the combustion chamber so as to extend between the inner wall 20 and the outer wall 1. The injection nozzle 52 includes an inner injection tube or sleeve member 2 having a bore 2a for the passage of a first propellant component, for example, oxygen, into the combustion chamber 54. In addition, the injection nozzle includes an outer tubular part or injection sleeve 3 which surrounds the tube 2 and which includes a front end portion 4 which extends through the inner wall 20 and terminates at the interior of the inner wall in a flanged discharge 19a. A second propellant component, for example, hydrogen W is located in the space 8 between the inner wall 20 and the outer wall 1 and it will flow under pressure through a feed bore 7 into an annular space 56 between the outer tube 3 and the inner tube 2 for subsequent flow through a narrow axially extending cylindrical passage 6 to join the discharge from the passage 2a and flow through the flared discharge 19a into the combustion chamber 54.

In accordance with a feature of the invention, the rear end of the inner tube 2 is formed as a ring piston or a flange 9 which surrounds an end portion 17 of the outer tube 3. This rear end engages into a cylindrical opening 10 of the outer wall 1 and provides an extension of a feed duct 11 for the oxygen component. The outer tube 3 includes an intermediate flange or pressure flange 12 which also engages within the cylindrical recess 10 at a spaced location from the flange 9. The intermediate flange 18 of the outer tube 3 is provided with a face 14 which is arranged in opposition to a face 16 of the flange 9 of the inner tube 2. A feature of the construction is that inner tube 3 is provided with a radially inwardly extending recess 13 and the outer wall 1 is provided with a redially inwardly extending recess 15. The base 13a of the recess 13 is flush with the end face 14 and the base 15a of the recess 15 is flush with the end face 16.

A fastening or sealing ring 58 made of a relatively soft material is initially inserted between the flanges of the inner and outer tubes before they are inserted into the cylindrical recess 10 of the outer wall 1. The ring 58 in the underformed state is indicated by the dot-dash lines. After the two parts are inserted completely into the recess 10, the ring 58 becomes deformed to the outline indicated in the drawing in solid lines so that portions of the ring fill the obliquely extending recess 13a and 15a, respectively, in order to form a form-locking interengagement of all of the parts.

The construction provides a pressure-proof seal and ensures that there will not be interreaction between the hydrogen W and the oxygen O such as by flow of the hydrogen through the separating joint W or by flow of the oxygen O through the separating joint 0.

The combustion chamber 50 is advantageously of a construction in which several nozzles 52 are distributed around the circumference and after each nozzle assembly is secured to the outer wall 1, the inner wall 20 is attached on the front end portions of the nozzles. The ends of the nozzles 52 are originally of cylindrical shape as indicated by the numeral 19 referring to the dot-dash outline thereof. After the inner wall 20 is in position, the ends of the outer tubes 3 are widened conically or flared against the conically-formed recesses in the inner wall 20.

What is claimed is:

1. A form-locking construction, comprising a receiving wall having a tubular recess of predetermined depth, an inner tube member having a flow passage therethrough terminating in a discharge, an outer tube member engaged over said inner tube member and having a flow port extending through a side thereof, said inner and outer tube members defining an annular passage therebetween adjacent said port and extending axially to the discharge of said inner tube member, said inner tube member having a flange extending around the end of said outer tube member which is adapted to be positioned in said receiving wall recess and terminating in a first opposing flange face, said outer tube member having an intermediate flange terminating in a second opposing flange face, said receiving recess including a first groove therein, said outer tube member having a second groove therein and a deformable annular insert located between said first and second opposed faces and being deformed into the grooves of said receiving recess and said outer tube member.

2. A form-locking construction, according to claim 1, wherein said receiving wall is provided with a propellant component passage aligning with the flow passage of said inner tube, member, and an inner wall engaged around said outer tube member adjacent the end thereof opposite to the end received in said receiving wall, said inner wall defining the interior of a combustion chamber.

3. A form-locking construction, according to claim 2, wherein said outer tube member is flanged at its outer end, the discharge of said through passage of said inner tube member terminating at the inner end of said flanged outer tube.

4. A form-locking construction, according to claim 1, wherein said first groove in said tubular recess extends obliquely in one direction said second groove and said outer tubular member extending obliquely in an opposite direction.

5. A combustion chamber construction comprising an inner wall having a tubular recess of predetermined depth, a propellant component duct connected into said recess from the exterior of said inner wall, an outer wall spaced from said inner wall and defining between said inner and outer wall a second propellant component duct, and a propellant injection nozzle carried by said outer wall and extending through said inner wall for discharging propellant components through said inner wall into a combustion chamber, said injection nozzle including an inner tube member having a flow passage therethrough terminating in a discharge for said first propellant component, an outer tube member engaged around said inner tube member in sealing engagement therewith, said inner and outer tube members defining an annular passage extending axially to the discharge of said inner tube member, said inner tube member having a port defined through a side thereof from said duct for said second propellant component which communicates to said annular passage for flow of said second propellant component through said annular passage and axially for discharge through said inner wall into said combustion chamber, said inner tube member having a flange extending around the end of said outer tube member which is received in the recess face, said outer tube member having an intermediate flange defining a second opposing flange face, said intermediate flange being adapted to be received within the recess of said outer wall, and a deformable sealing member disposed between said first and second opposed flange faces and being deformed to tightly hold said inner and outer tube members together and to said outer wall.

6. A combustion chamber construction, according to claim 5, wherein said combustion chamber outer wall includes a groove defined in said recess, said outer tube member having a groove defined therein adjacent said intermediate flange, said deformable member including a deformed portion extending into the respective grooves of said outer wall and said outer tube member.

7. A combustion chamber construction, according to claim 6, wherein said inner wall of said combustion chamber includes flared openings through which said outer tube member extends, said inner tube member being spaced inwardly from the end of said outer tube member, said outer tube member being flanged from the location of said inner tube member to the interior of said combustion chamber in a wall.

References Cited

UNITED STATES PATENTS

| | | | |
|---|---|---|---|
| 3,101,773 | 8/1963 | Blaha | 431—166 |
| 3,468,616 | 9/1969 | Ward | 431—166 |

FOREIGN PATENTS

| | | | |
|---|---|---|---|
| 560,635 | 9/1957 | Belgium | 431—159 |

EDWARD G. FAVORS, Primary Examiner